United States Patent [19]
Culp

[11] 3,917,146
[45] Nov. 4, 1975

[54] PORTABLE VIBRATORY WELDING APPARATUS

[75] Inventor: Donald R. Culp, Danbury, Conn.

[73] Assignee: Branson Ultrasonics Corporation, New Canaan, Conn.

[22] Filed: Apr. 4, 1975

[21] Appl. No.: 565,237

[52] U.S. Cl. .................... 228/1; 228/110; 228/115
[51] Int. Cl.² .................... B23K 1/06; B23K 5/20
[58] Field of Search ................ 228/1, 110, 111, 115

[56] References Cited
UNITED STATES PATENTS

| | | | |
|---|---|---|---|
| 3,752,380 | 8/1973 | Shoh | 228/115 X |
| 3,813,006 | 5/1974 | Holze | 228/1 |

*Primary Examiner*—Al Lawrence Smith
*Assistant Examiner*—Margaret Joyce
*Attorney, Agent, or Firm*—Ervin B. Steinberg; Philip J. Feig

[57] ABSTRACT

The invention concerns a portable vibratory welding apparatus for welding together metal workpieces which generally are inaccessible for being disposed upon an anvil of a conventional, stationary vibratory welding apparatus. The anvil of the present apparatus is movable and coupled to a support by a leaf spring which provides a bias for causing a gap between the jaw surface of the anvil and a welding tip. Responsive to fluid pressure the anvil is caused to pivot upon a rounded surface disposed between the support and a spacer block of the spring. The pivotal motion of the anvil relative to the support closes the gap between the jaw surface and the welding tip while bowing the leaf spring. After welding is completed and the fluid pressure is released, the force of the leaf spring restores the jaw to its open position.

11 Claims, 6 Drawing Figures

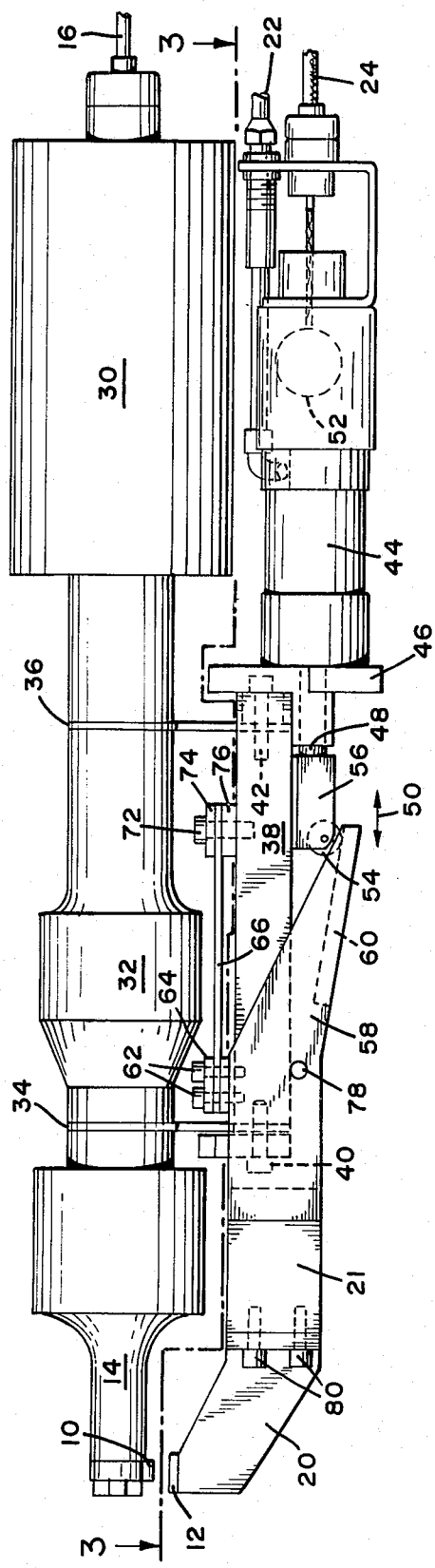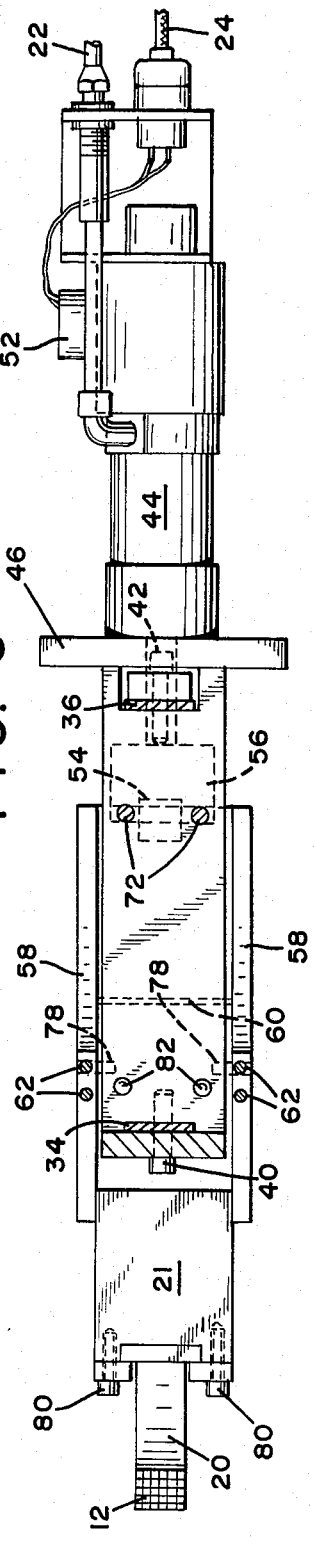

PORTABLE VIBRATORY WELDING APPARATUS

BRIEF SUMMARY OF THE INVENTION

This invention refers to an apparatus for welding together metal workpieces by means of vibratory energy.

More specifically, the present invention concerns an arrangement for holding two metal workpieces to be joined in intimate contact under a static force and applying to one of the workpieces vibratory energy in a direction substantially perpendicular to the direction of the applied force. The result is a non-fusion metallurgical bond at the interface between the workpieces. The vibratory energy supplied generally is in the sonic or ultrasonic frequency range, and most commonly is in the range between one to 100 kHz. This welding method is well-known in the art, see for instance, U.S. Pat. No. 2,946,119 of J. B. Jones et al., dated July 26, 1960.

Quite specifically, the present invention concerns a portable vibratory welding apparatus useful for welding together metal workpieces which are generally inaccessible for being disposed upon an anvil in a conventional, stationary vibratory welding apparatus. To this end, the present welding apparatus is of the portable gun type construction and includes novel features for achieving reliable spot welds. For welding the workpieces in superposed relation are placed on an anvil which is coupled to means for urging the workpieces into intimate contact against a workpiece engaging welding surface or tip. A leaf spring member rigid in the direction of the applied vibratory energy but yieldable along an axis normal to the direction of the vibratory motion couples the anvil to a support for ensuring that the workpieces when clamped remain fixed during welding. Upon completion of the weld and removal of the force exerted by the anvil, the anvil returns to its normal position to provide for the removal of the welded workpiece.

The use of a suspended portable vibratory energy welding apparatus permits the welding of workpieces heretofore considered impossible to weld because of their size and the nature of their geometry. Vibratory energy is employed for welding together workpieces of similar or dissimilar metals. For example, copper workpieces can be welded to other workpieces made either of copper or aluminum. Typical of such welded workpiece combinations is the joining of aluminum conductors to copper terminations.

A principal object of the present invention, therefore, is the provision of a portable vibratory energy welding apparatus.

Another principal object of the invention is the provision of a vibratory welding apparatus using a leaf spring member as a coupling member and as a bias means for providing a force for opening the gap between a workpiece contacting anvil and a welding surface after completion of the weld.

A further object of the invention is the provision of a vibratory welding apparatus which exhibits substantially no play between the anvil and the welding tip in the direction of the vibratory motion.

Further and still other objects of the present invention will become more clearly apparent from the following description when taken in conjunction with the accompanying drawings.

BRIEF DESCRIPTION OF THE DRAWINGS

FIG. 2 is an elevational view of the vibratory energy welding apparatus per FIG. 1;

FIG. 3 is a sectional view of the apparatus taken along the line 3—3 in FIG. 2;

DETAILED DESCRIPTION OF THE INVENTION

Figure 1:
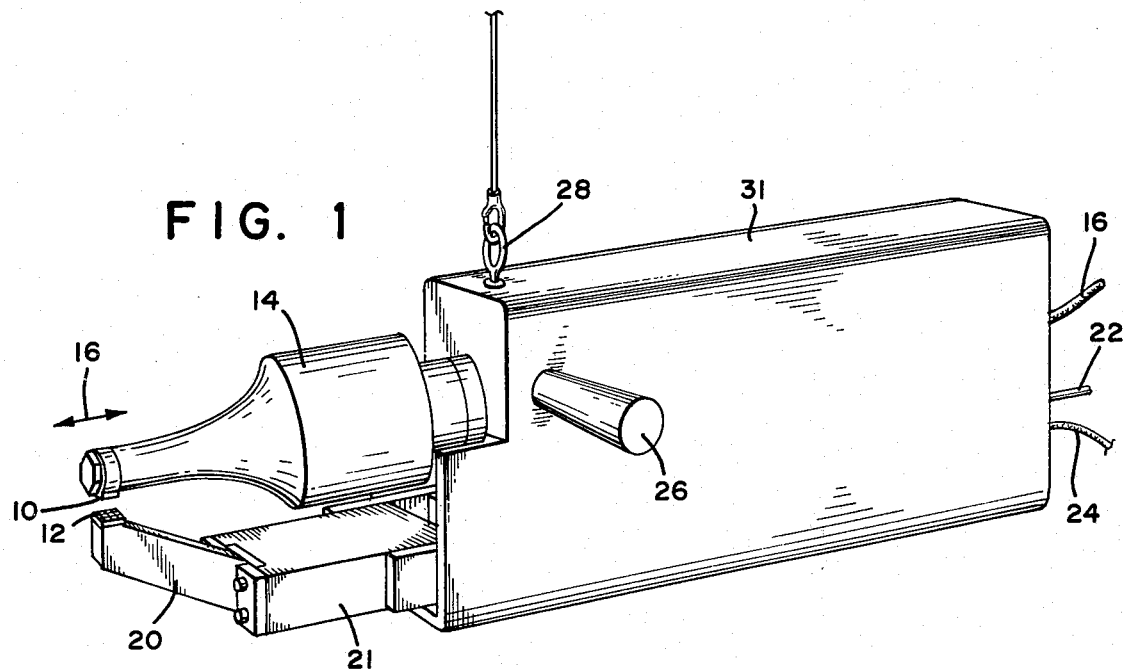
FIG. 1 is a perspective view of a preferred embodiment of the invention.

Referring now to the figures and FIG. 1 in particular, a perspective view of the portable vibratory energy welding apparatus is shown. Workpieces to be welded are inserted into the gap formed by a stationary welding tip 10 and an anvil surface 12 brazed to a jaw 20 which is secured to an anvil 21. A half wavelength resonator 14, commonly referred to also as a horn, is designed to undergo cyclic expansion and contraction along its longitudinal axis responsive to predetermined high frequency electrical energy provided along conductor 16 from a high frequency electrical generator not shown. The welding tip 10 is securely mounted to the half wavelength resonator at an antinodal region as described in U.S. Pat. No. 3,813,006 of E. P. Holze, Jr. et al., entitled "Replaceable Welding Tip for Vibratory Welding Apparatus", issued May 28, 1974. The tip or workpiece engaging surface undergoes vibratory motion in the direction of arrow 16 when the high frequency electrical energy is applied to an electroacoustic converter 30 (see FIG. 2) to which the half wavelength resonator 14 is coupled. The jaw 20 secured to the anvil 21 is urged toward the tip 10 responsive to fluid pressure provided by conduit 22 to a motive means comprising a cylinder 44 and a piston 48. Responsive to fluid pressure the piston 48 moves to the left, see FIGS. 5 and 6, and the jaw 20 moves toward the tip 10. Fluid pressure application is controlled by an electrical signal along conductor 24 via a suitable electrically operated fluid valve 52, see FIG. 2. To facilitate manipulation of the welding apparatus, a handle 26 is provided for ease in locating the apparatus relative to the workpieces. The welder is supported also by a cable which is coupled to an eye 28 fastened onto the cover 31 which encloses the welding apparatus.

Referring now to FIG. 2, a high frequency electrical signal is provided along conductor 16 to the electroacoustic converter 30 containing piezoelectric disks. The converter converts the applied high frequency electrical energy to mechanical energy for causing the intermediate coupling member 32 and the horn 14 to be resonant at the predetermined high frequency. The construction of the electroacoustic converter 30 is known in the art and can be as is shown in U.S. Pat. No. 3,328,610 issued to S. E. Jacke et al., entitled "Sonic Wave Generator", dated June 27, 1967. The intermediate coupling member 32, also referred to as a "booster" horn, and the half wavelength resonator 14 are dimensioned to cause the welding tip 10 to be disposed substantially at an antinodal region of the longitudinal vibration when the piezoelectric disks disposed within the converter 30 are energized with alternating current electrical energy of the predetermined frequency. The assembly comprising the converter, intermediate coupling member and resonator (horn) is substantially as shown and described in U.S. Pat. No. 3,752,380 (FIG. 9) of A. Shoh, entitled "Vibratory Welding Apparatus" issued Aug. 14, 1973.

The booster horn 32 is coupled to both the converter 30 and the half wavelength resonator 14 by means of respective axially disposed threaded bolts. Two apertured leaf spring members 34 and 36 couple the above described vibratory assembly at antinodal regions to a support 38 by means of a pair of screws 40 and 42 and suitable clamp plates. This method of mounting the converter, booster horn and output horn is explained in the patent to Shoh supra.

The fluid actuated cylinder 44 is fixedly attached by screws passing through mounting plate 46 to the support 38. Piston 48 undergoes reciprocating translating motion along the direction of arrow 50 responsive to the fluid pressure in conduit 22 and actuation of the solenoid valve 52 by an electrical signal along conductor 24. A roller 54 is located at the lower frontal edge of block 56 coupled to the end of piston 48.

Figure 4:
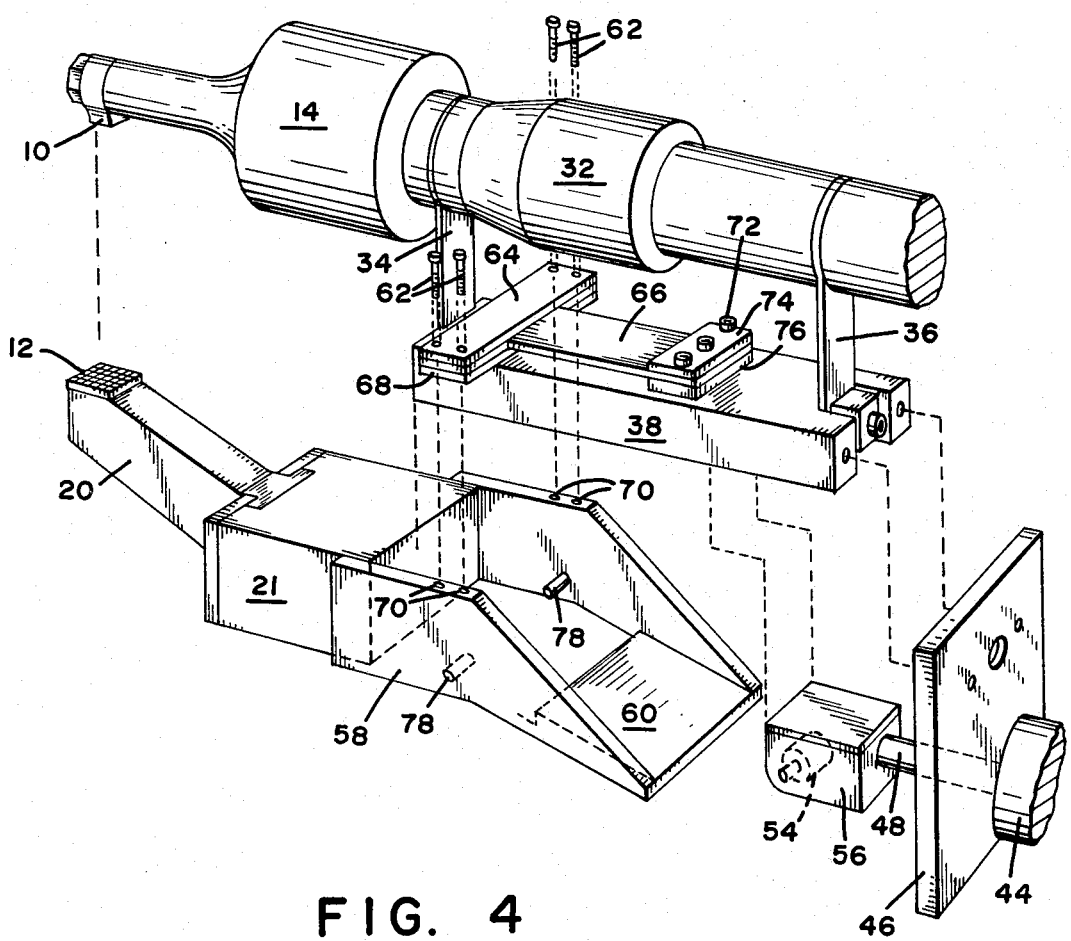
FIG. 4 is an exploded view illustrating the interconnection of the various elements of the vibratory energy welding apparatus.

As best seen in FIG. 4, a bracket 58 having an inclined ramp surface 60 is welded to the anvil 21. The anvil 21, in turn, coupled to the support 38 by a leaf spring member 66 one end of which is secured to the bracket 58 by a plurality of screws 62 which pass through clamp plate 64, the spring member 66 and clamp plate 68 into the bracket 58. The opposite end of the spring member 66 is secured to the support 38 by a set of screws 72 passing through clamp plate 74, the spring member 66 and clamp plate 76 into the support 38. When the screws 62 are tightened, the underside of clamp plate 68 is urged against the heads of a pair of round head screws 82, see FIGS. 3, 5 and 6, which slightly extend from the upper surface of the support 38. The rounded surfaces serve as pivot surfaces for the pivotal motion of the anvil 21 relative to the welding tip 10.

The spring member 66 is constructed as a flat T-shaped leaf spring to provide substantial rigidity and no play in the direction of arrow 50, which is also the axis of vibration of the converter and horn, see arrow 16 in FIG. 1, but to yield in the direction substantially perpendicular to the vibrational axis. The spring advantageously is made of sheet metal. The clamp plate 76 is dimensioned to be slightly thicker than clamp plate 68 to take into account the height of the protruding screws 82. Horizontally disposed pins 78 in the bracket 58 support the underside of the support 38, cause the roller 54 to be in engagement with the ramp suface 60 and limit the motion of the anvil.

The jaw 20 is coupled to the front end of the anvil 21 by means of screws 80, see FIGS. 1, 2 and 3. The jaw 20 contains slotted holes for adjusting the opening between the welding tip 10 and the anvil surface 12. For rigidity, a slide arrangement is provided between the jaw 20 and anvil 21 as clearly illustrated in FIG. 4.

The vibratory welding apparatus described provides that the relative displacement of the jaw surface 12 and the welding tip 10 along the axis of vibratory motion remains substantially unchanged with time and use. The present embodiment does not contain bearings or pivot means which are subject to wear with age and inherently exhibit "play", causing relative displacement between the welding tip 10 and the jaw surface 12 from weld to weld. It is apparent that the present invention provides for play-free alignment of the jaw 20 relative to the welding tip 10. This feature is particularly important considering that the peak to peak displacement of the tip during the welding process along the vibratory axis at a frequency of 20 kHz is generally less than 0.1 millimeter.

Figure 5:
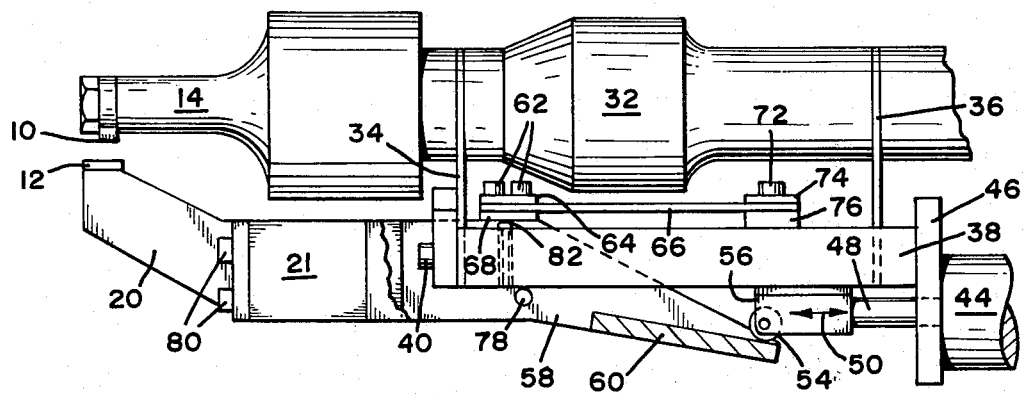
FIG. 5 is a partial elevational view of the welding apparatus when no workpieces are disposed in the open gap between the anvil and the welding tip.
Figure 6:
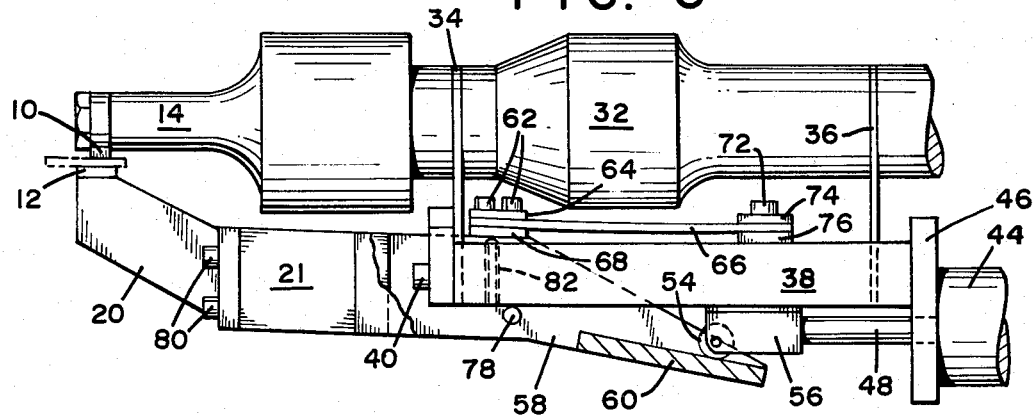
FIG. 6 is a partial elevational view of the welding apparatus similar to FIG. 5, but with workpieces to be welded disposed in the closed gap of the apparatus.

Referring to FIGS. 5 and 6, the operation of the vibratory energy welding apparatus may now be described. FIG. 5 illustrates the condition of the apparatus in the absence of workpieces to be welded disposed within the gap while FIG. 6 illustrates the condition when workpieces to be welded are disposed between the welding tip 10 and jaw surface 12.

When the welding apparatus is not activated, the leaf spring is substantially flat and the roller 54 is disposed at the lower end of the ramp surface 60, see FIG. 5.

For operating the instant apparatus, a workpiece is disposed between the surfaces 10 and 12. A suitable electrical switching means, such as a foot switch, is closed which applies electrical energy along conductor 24 to the solenoid valve 52. Operation of the solenoid valve permits pressurized fluid from conduit 22 to enter into the cylinder 44, causing the piston 48 with block 56 to move toward the left, see FIG. 5. The roller moves along the ramp surface 60 causing the anvil to pivot slightly clockwise, the rounded top surfaces of screws 82 disposed in support 38 and engaging the underside of plate 68 acting as pivot surfaces. The pivoting motion of the anvil 21 relative to the support 38 bows the leaf spring 66 and puts the spring under stress, see FIG. 6. When the workpiece is sufficiently clamped with this static force resulting from the fluid pressure, the converter 30 is energized for a predetermined period for providing the non-fusion spot weld. Thereafter, the solenoid valve is operated again to vent the cylinder, permitting the force of the spring 66 to effect a retraction of the piston 48 into the cylinder 44. thereby opening the jaw 20 and restoring the condition shown in FIG. 5.

The adjustable welding gap provided by the adjusting screws 80, permitting the jaw 20 to be set for different openings relative to the workpiece engaging surface 10 has two principal advantages. Firstly, the travel of the jaw for exerting the static clamping force can be minimized, and secondly, the gap can be set to a safe minimum for preventing the operator from inserting a finger into the gap.

While a preferred embodiment of a high frequency vibratory welding apparatus has been described and illustrated, further variations and modifications may be made in accordance with the broad teachings of the present invention which shall be limited only by the scope of the appended claims.

What is claimed is:

1. A vibratory welding apparatus comprising:
a support;
an electroacoustic converter supported by said support, said converter being constructed to be resonant along its longitudinal axis when energized with electrical energy of predetermined frequency for providing vibrations;
a horn having a workpiece engaging surface coupled to said converter for transmitting vibrations from said converter to a workpiece in contact therewith;
anvil means having a jaw;

mounting means which include a leaf spring mounting said anvil means to said support for limited pivotal motion of said anvil means relative to said support, said leaf spring maintaining said anvil means in substantially play-free alignment relative to said support along said axis and providing a bias force for opposing the pivotal motion of said anvil means relative to said support, and motive means coupled between said support and said anvil means for causing when actuated said anvil means to undergo pivotal motion for moving said jaw toward said workpiece engaging surface and for providing a static clamping force upon a workpiece disposed between said anvil means and said workpiece engaging surface, said clamping force being substantially perpendicular to said axis.

2. A vibratory welding apparatus as set forth in claim 1, and means disposed for limiting the motion of said jaw away from said workpiece engaging surface.

3. A vibratory welding apparatus as set forth in claim 1, said mounting means including at least one curved bearing surface disposed between said support and said anvil means for providing a pivot surface for said pivotal motion.

4. A vibratory welding apparatus as set forth in claim 3, said curved bearing surface comprising a round head screw.

5. A vibratory welding apparatus as set forth in claim 1, said motive means comprising a fluid actuated cylinder and a piston having a roller attached thereto.

6. A vibratory welding apparatus as set forth in claim 1, a roller and a ramp surface disposed between said anvil means and said support, and said motive means upon being energized causing said roller to move relative to said ramp surface whereby to cause said anvil means to undergo said pivotal motion.

7. A vibratory welding apparatus as set forth in claim 1, and adjusting means disposed between said jaw and anvil means for adjusting the opening between said jaw and said workpiece engaging surface.

8. A vibratory welding apparatus as set forth in claim 1, and additional leaf springs coupling said electroacoustic converter to said support at antinodal regions of longitudinal motion said additional leaf springs being yielding along the longitudinal axis of the vibratory motion but substantially rigid in a direction substantially perpendicular thereto.

9. A vibratory welding apparatus as set forth in claim 1, said leaf spring being secured with one end to said support and with the other end to said anvil means.

10. A vibratory welding apparatus as set forth in claim 9, said respective ends of said leaf spring being secured to said support and said anvil means by means of clamp plates and screw means.

11. A vibratory welding apparatus as set forth in claim 1, said leaf spring being bowed when said jaw has moved toward said workpiece engaging surface and is substantially planar when said jaw is in its normally non-pivoted position.

* * * * *